(12) United States Patent
Shimizu

(10) Patent No.: US 10,952,511 B2
(45) Date of Patent: Mar. 23, 2021

(54) STRING END COVER

(71) Applicant: NIFCO INC., Yokosuka (JP)

(72) Inventor: Yohei Shimizu, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 16/302,442

(22) PCT Filed: May 16, 2017

(86) PCT No.: PCT/JP2017/018414
§ 371 (c)(1),
(2) Date: Nov. 16, 2018

(87) PCT Pub. No.: WO2017/199975
PCT Pub. Date: Nov. 23, 2017

(65) Prior Publication Data
US 2019/0216181 A1   Jul. 18, 2019

(30) Foreign Application Priority Data

May 19, 2016   (JP) .............................. JP2016-100626

(51) Int. Cl.
*A44B 19/26* (2006.01)
*A41B 1/00* (2006.01)
*A44B 99/00* (2010.01)

(52) U.S. Cl.
CPC .............. *A44B 19/262* (2013.01); *A41B 1/00* (2013.01); *A44B 99/00* (2013.01)

(58) Field of Classification Search
CPC ....... A44B 19/262; A44B 99/00; A44B 11/10; A41B 1/00; F16G 11/101; F16G 11/048
See application file for complete search history.

(56) References Cited

U.S. PATENT DOCUMENTS

| | | | | |
|---|---|---|---|---|
| 5,692,272 | A | * | 12/1997 | Woods .................... A44B 99/00 24/115 M |
| D624,396 | S | * | 9/2010 | Yoshiguchi ..................... D8/383 |
| 9,131,750 | B2 | * | 9/2015 | Takahashi ................ A43C 7/08 |
| 9,498,027 | B2 | * | 11/2016 | Chen ..................... A44B 19/262 |
| 9,862,143 | B2 | * | 1/2018 | Chen ..................... A44B 19/262 |

(Continued)

FOREIGN PATENT DOCUMENTS

| EP | 1559927 A1 | 8/2005 |
|---|---|---|
| JP | H09-164007 A | 6/1997 |

(Continued)

OTHER PUBLICATIONS

PCT/ISA/210, "International Search Report for International Application No. PCT/JP2017/018414," dated Aug. 1, 2017.

(Continued)

*Primary Examiner* — Robert Sandy
*Assistant Examiner* — Louis A Mercado
(74) *Attorney, Agent, or Firm* — Manabu Kanesaka

(57) ABSTRACT

An end cover to be attached to an end of a string is provided. The end cover includes a finger-hooking projecting portion having a first finger-hooking face, and a base portion having a second finger-hooking face, and the second finger-hooking face is provided at a position to suppress a rotation of the end cover as a support point of the first finger-hooking face when a pulling force acts on the string using the first finger-hooking face.

5 Claims, 9 Drawing Sheets

(56) References Cited

U.S. PATENT DOCUMENTS

| | | | |
|---|---|---|---|
| 9,877,550 B1* | 1/2018 | Chen | A44B 19/262 |
| 10,285,813 B2* | 5/2019 | Kocaturk | A61B 17/0487 |
| 2005/0166369 A1 | 8/2005 | Takahashi | |
| 2006/0168770 A1 | 8/2006 | Takahashi | |
| 2016/0007692 A1 | 1/2016 | Chen | |

FOREIGN PATENT DOCUMENTS

| | | | | |
|---|---|---|---|---|
| JP | 2001-61518 | * | 3/2001 | A44B 11/258 |
| JP | 2001-061518 A | | 3/2001 | |
| JP | 4528687 B2 | | 8/2010 | |
| JP | 2012-130538 A | | 7/2012 | |
| NL | 1039605 C2 | | 6/2014 | |
| WO | 2016/004827 A1 | | 1/2016 | |

OTHER PUBLICATIONS

Europe Patent Office, "Search Report for European Patent Application No. 17799399.5," dated Nov. 11, 2019.

* cited by examiner

STRING END COVER

FIELD OF TECHNOLOGY

The present invention relates to an improvement of a string end cover.

BACKGROUND ART

There is a string stopper comprising a cylindrical socket for housing an end portion of a string, and a plug to fit into the socket, and from a state wherein a leg portion of the plug is interposed between two string end portions, a leg portion side of the plug fits into the socket so that the string stopper is attached to the string end portions by clamping the string end portions between the leg portion of the plug and the socket (see Patent Document 1).

Such a string stopper becomes also a handle to be gripped when performing an operation to pull the string. However, the socket of the Patent Document 1 merely has a simple flat square cylindrical shape, and a particular shape facilitating the gripping is not applied.

PRIOR ART DOCUMENT

Patent Document

Patent Document 1: Japanese Patent No. 4528687

SUMMARY OF THE INVENTION

Problems to be Solved by the Invention

A main object of the present invention is to allow this kind of string end cover to be easily gripped, and in a gripped state, a sufficient pulling force can act on the string.

Means for Solving the Problems

In order to obtain the aforementioned object, in the present invention, a string end cover, which is an end cover attached to an end of a string, comprises a finger-hooking projecting portion having a first finger-hooking face, and a base portion having a second finger-hooking face, and the second finger-hooking face is provided at a position to suppress a rotation of the end cover at a support point on the first finger-hooking face when a pulling force acts on the string using the first finger-hooking face.

The end cover is easily gripped by the first finger-hooking face and the second finger-hooking face, and in a gripped state, a sufficient pulling force can act on the string. For example, even in a state with gloves worn, the end cover can be gripped with a high grip performance, and in that state, the sufficient pulling force can act on the string.

In one of aspects of the present invention, the first finger-hooking face is formed substantially along an imaginary first flat face, the second finger-hooking face is formed substantially along an imaginary second flat face, and a minor angle formed by the first flat face and the second flat face becomes an acute angle.

In one of the aspects of the present invention, the first finger-hooking face and the second finger-hooking face are both formed along an arc of an imaginary circle.

Also, in one of the aspects of the present invention, the end cover comprises a lock member including a locking portion relative to the end of the string, and a case member for fitting the lock member into an inside, including, at the inside, a locking face for fixing the end cover in the end in cooperation with the locking portion.

Also, in one of the aspects of the present invention, the case member includes a projection portion which becomes one portion of the finger-hooking projecting portion, and on a side opposite to a side where the first finger-hooking face in the projection portion is formed, there is formed a fitting opening for the lock member.

Also, in one of the aspects of the present invention, in the base portion, there is formed a through hole.

Effect of the Invention

According to the present invention, the string end cover can be easily gripped, and can be easily gripped especially even in the state with gloves worn, or in a state with a decline in grip strength, and in the gripped state, the sufficient pulling force can act on the string.

BEST MODES OF CARRYING OUT THE INVENTION

Hereinafter, based on FIG. 1 to FIG. 14, a typical embodiment of the present invention will be explained. An end cover C for a string S according to the present embodiment is to be attached to ends Sa by housing the ends Sa of the strings S in an inside. Such string S may have any shape (a round string S, a flat string S, and the like), any material, or any structure (a knitted string S, an elastic string S, a string S made of synthetic resin, and the like) provided that the end cover C can be attached in the aforementioned manner. Such end cover C improves a design property of the ends Sa of the strings S provided in various types of articles. Also, such end cover C prevents the ends Sa of the strings S from coming loose. Also, such end cover C allows an operation for pulling the strings S and the like to be easily carried out.

Figure 5:
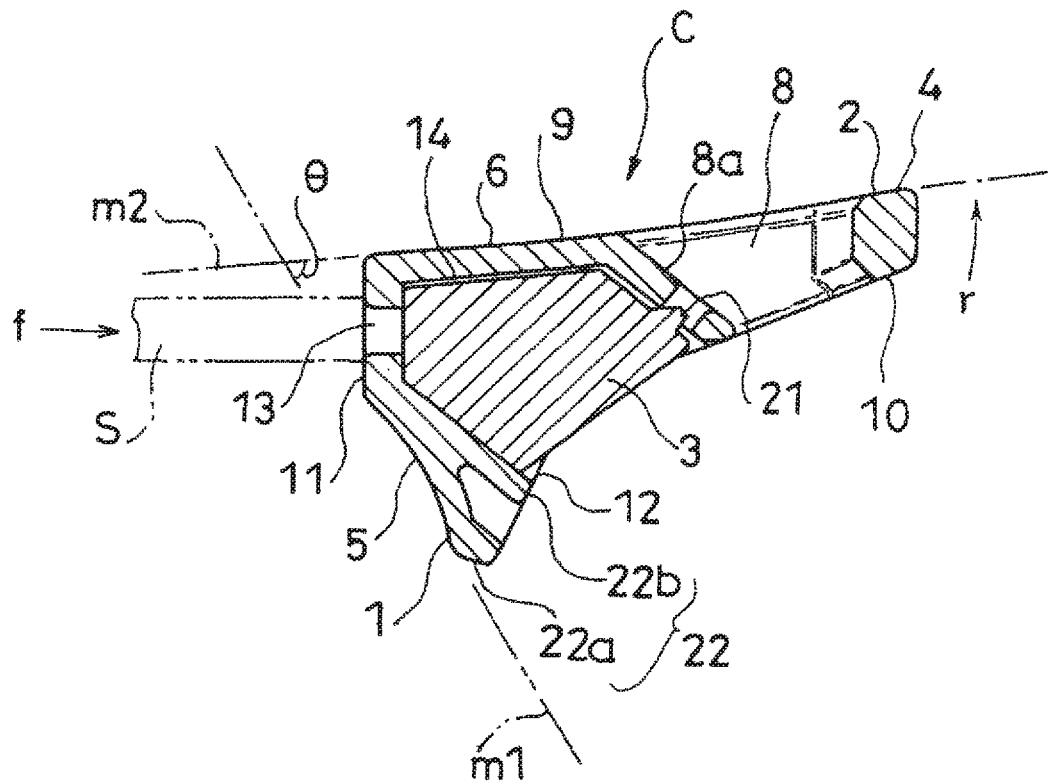
FIG. 5 is a cross-sectional view taken along a position of line A-A in FIG. 4.

As shown in FIG. 5, the end cover C comprises a finger-hooking projecting portion 1 including a first finger-hooking face 5, and a base portion 2 including a second finger-hooking face 6.

The second finger-hooking face 6 is provided at a position to suppress a rotation (rotation toward a symbol r in FIG. 5) of the end cover C at a support point on the first finger-hooking face 5 when a pulling force (force toward the symbol f in FIG. 5) acts on the string S using the first finger-hooking face 5.

In an illustrated example, one finger of a right hand or a left hand, for example, a thumb, is caught on the first finger-hooking face 5 positioned on a left side in FIG. 5, and another finger of the right hand or the left hand, for example, a forefinger, lays on the second finger-hooking face 6 positioned on an upper side in FIG. 5 so as to carry out an operation to pull the string S through the end cover C to a right side in FIG. 5.

By the first finger-hooking face 5 and the second finger-hooking face 6, the end cover C is easily gripped, and in a gripped state, a sufficient pulling force can act on the string S. For example, even in a state with gloves worn, the end cover C can be gripped with a high grip performance, and in that state, the sufficient pulling force can act on the string S.

The first finger-hooking face 5 is formed substantially along an imaginary first flat face m1 (see FIG. 5), the second finger-hooking face 6 is formed substantially along an imaginary second flat face m2 (see FIG. 5). Therewith, a minor angle θ (see FIG. 5) formed by the first flat face m1 and the second flat face m2 becomes an acute angle.

Thereby, when the pulling force acts on the string S, the rotation of the end cover C can be effectively suppressed.

Also, the first finger-hooking face 5 and the second finger-hooking face 6 are both formed along an arc of an imaginary circle. Specifically, both the first finger-hooking face 5 and the second finger-hooking face 6 have a gently curved face such that the minor angle side becomes a curved outside.

Thereby, a finger can easily lay on the first finger-hooking face 5 and the second finger-hooking face 6, and the end cover C can be gripped with the high grip performance.

Figure 1:
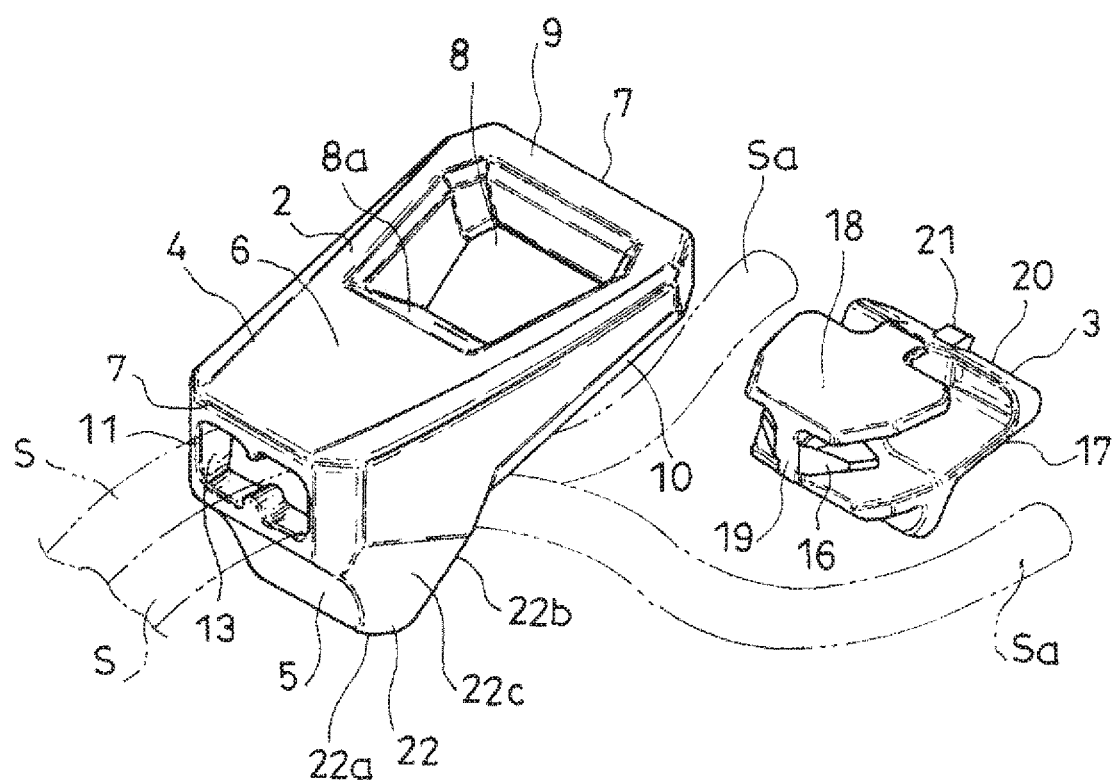
FIG. 1 is a perspective view of a separated state of a string end cover according to one embodiment of the present invention.
Figure 2:
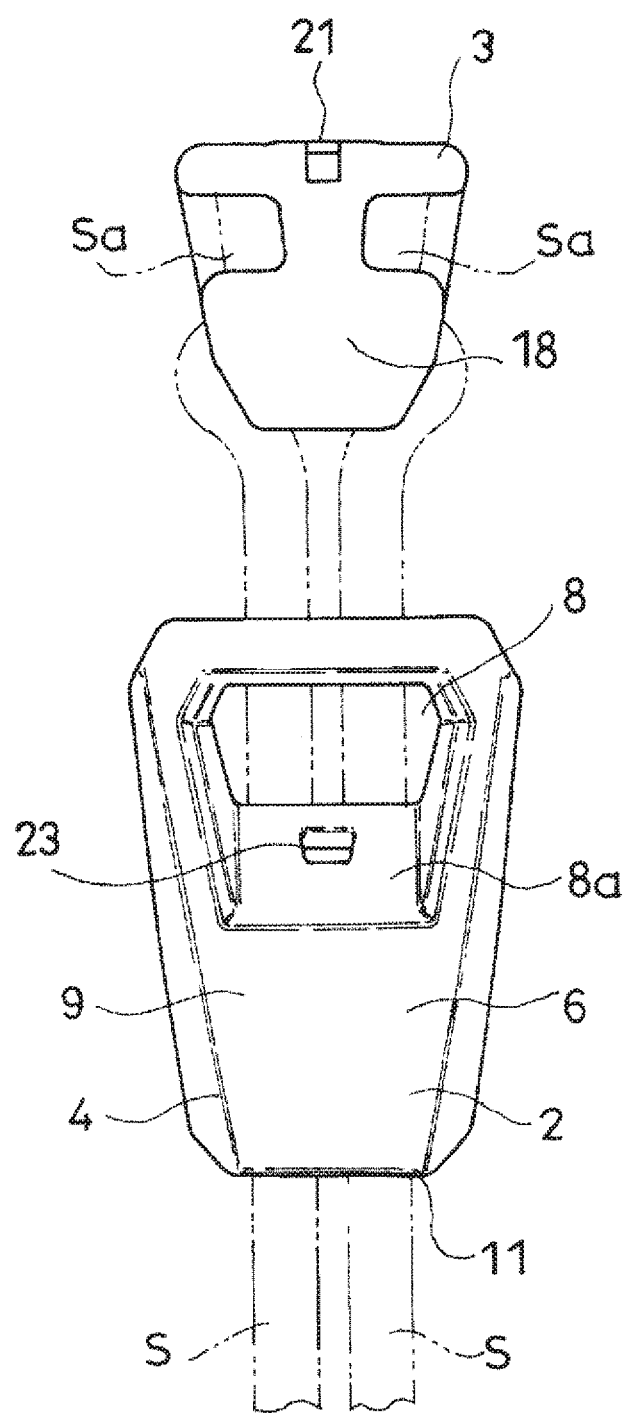
FIG. 2 is a front view of the separated state of the end cover.
Figure 3:
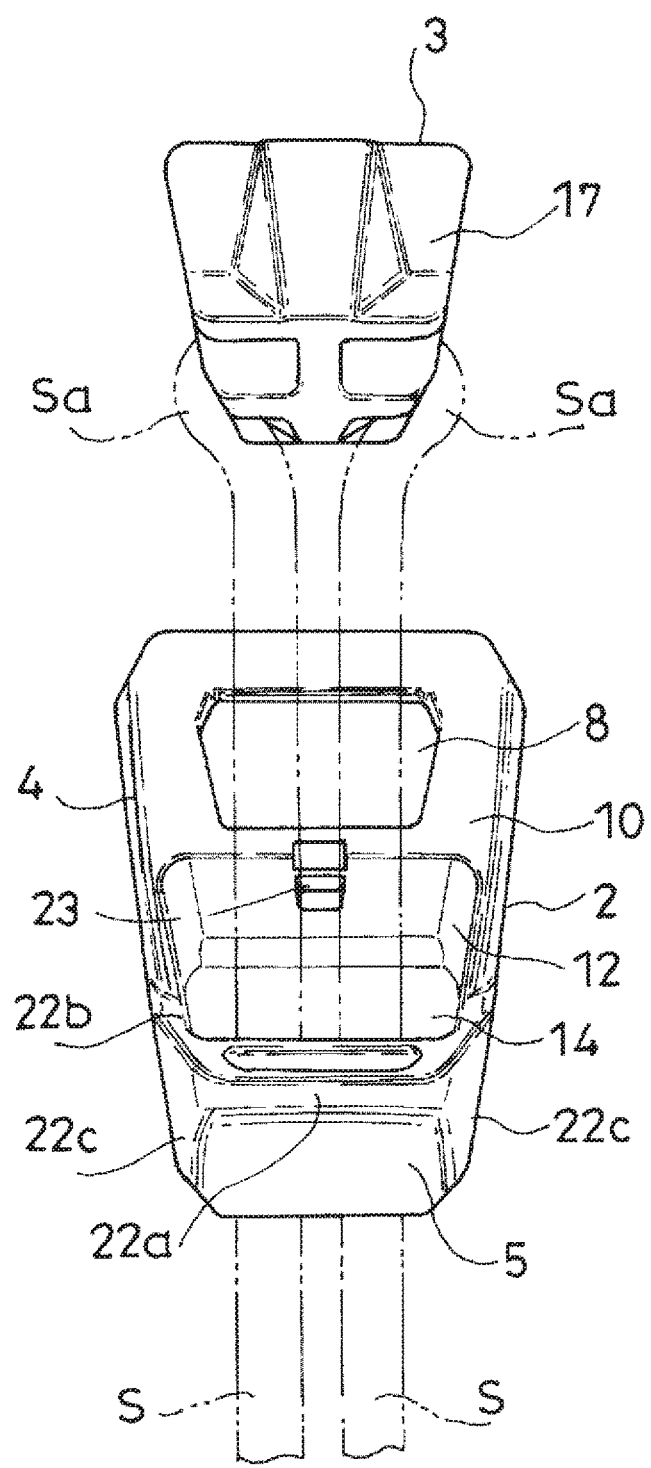
FIG. 3 is a rear view of the separated state of the end cover.

In the illustrated example, as shown in FIG. 1, the end cover C is formed by a lock member 3 and a case member 4.

The case member 4 includes a projection portion 22 which becomes one portion of the finger-hooking projecting portion 1. Also, the base portion 2 is provided in the case member 4.

Figure 6:
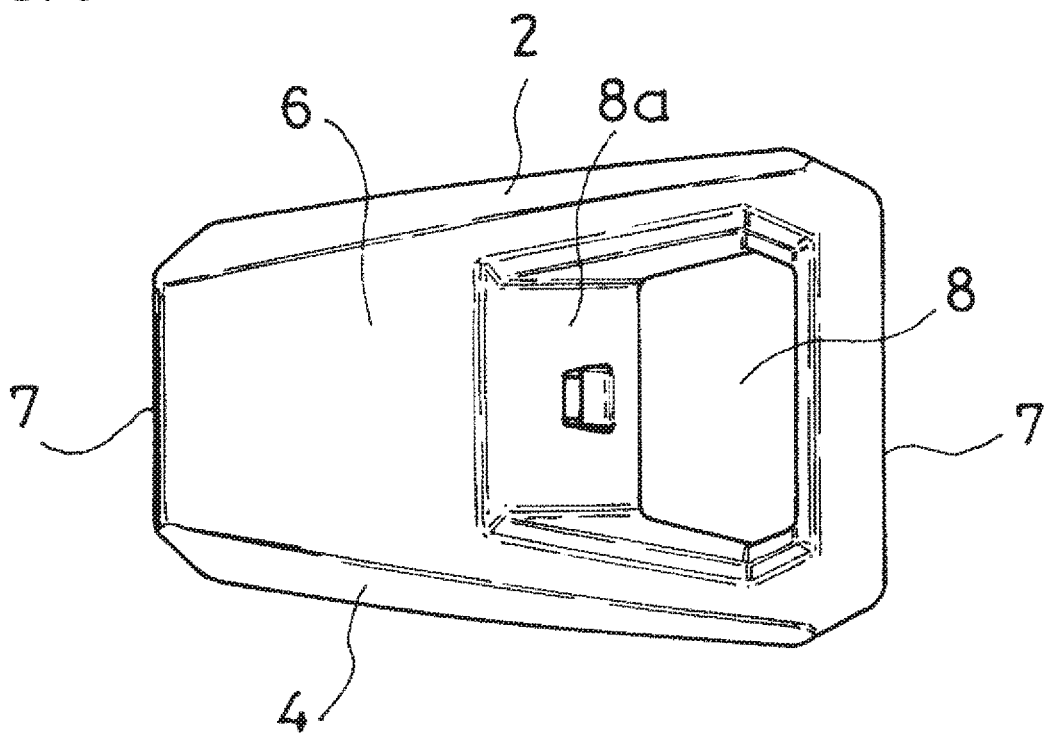
FIG. 6 is a front view of the end cover.
Figure 7:
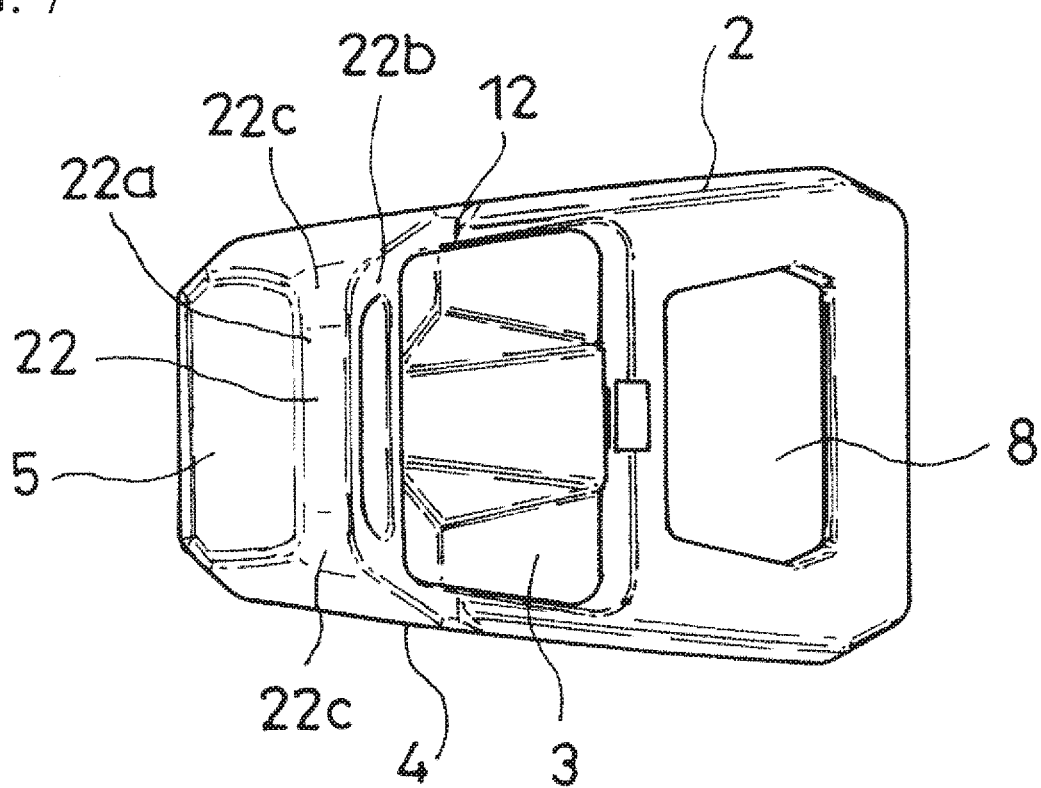
FIG. 7 is a rear view of the end cover.
Figure 8:
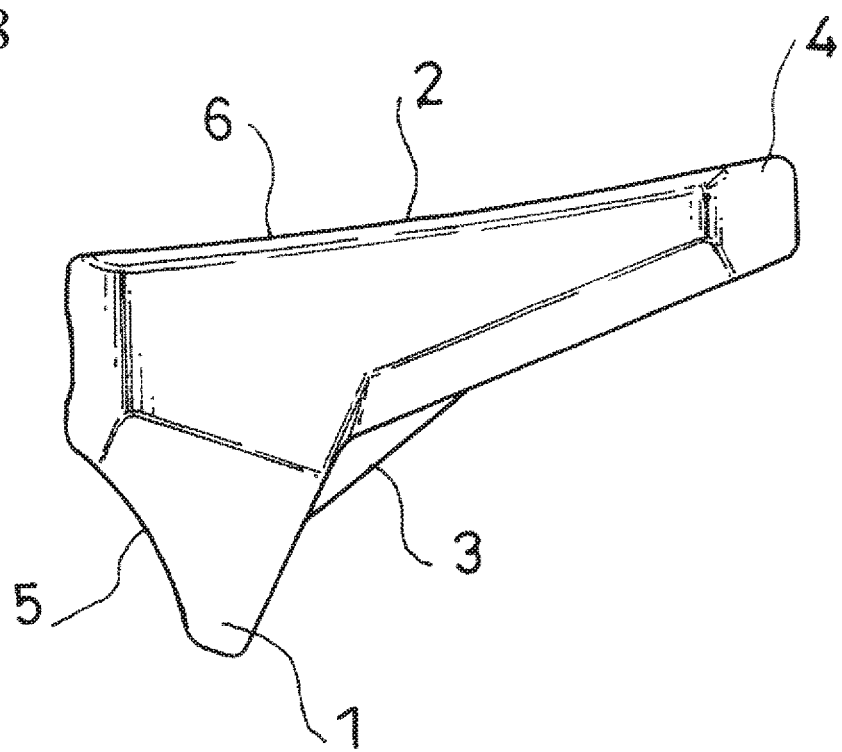
FIG. 8 is a side view of the end cover.
Figure 9:
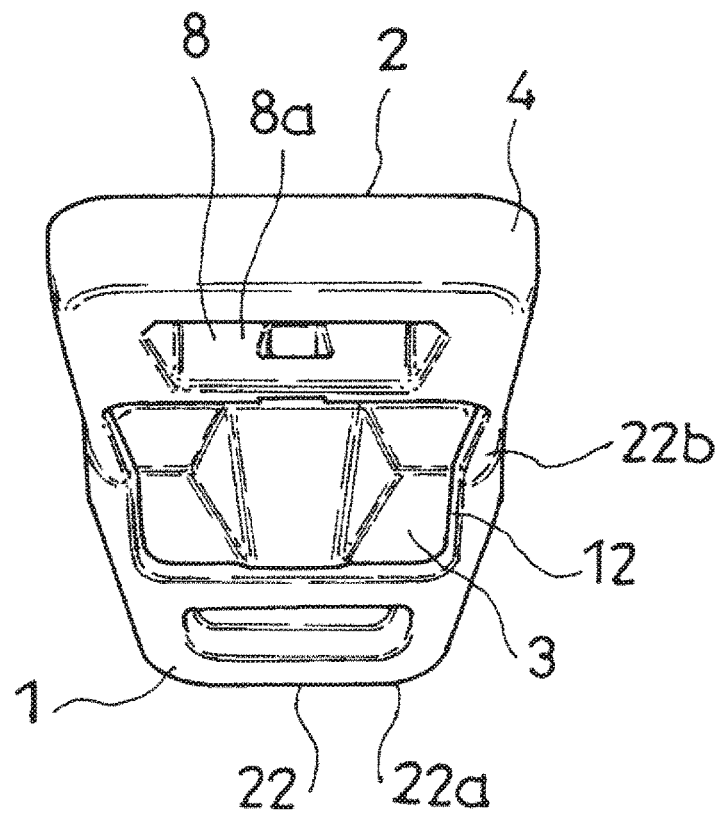
FIG. 9 is a side view of the end cover, and shows the end cover viewed from a right side in FIG. 8.
Figure 10:
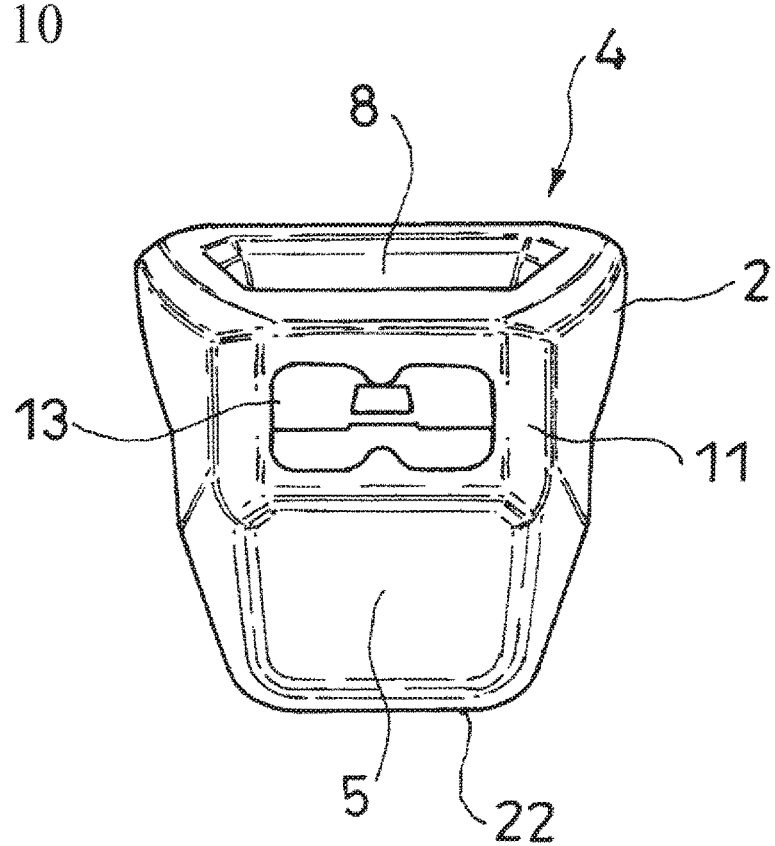
FIG. 10 is a side view of a case member forming the end cover.
Figure 11:
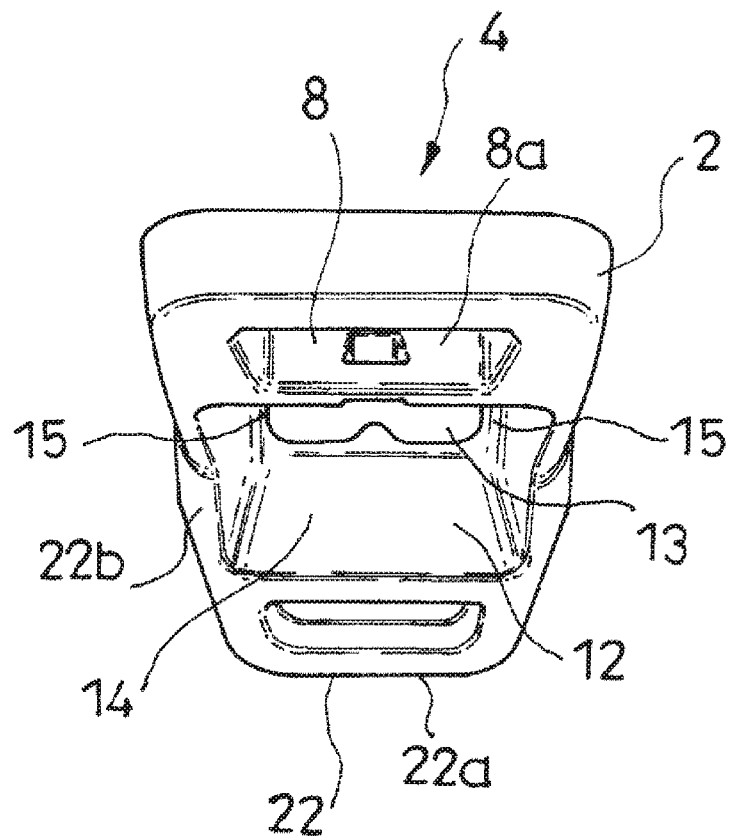
FIG. 11 is a side view of the case member on a side opposite to FIG. 10.

In the illustrated example, as shown in FIG. 6, the base portion 2 of the case member 4 has a length and a width, and has a substantially rectangular shape in a state of a front view. One of two width-side side portions 7 and 7 of the base portion 2 is formed so as to be longer than the other of the two width-side side portions 7 and 7, and the base portion 2 is formed so as to gradually reduce the width as coming close to a left side from a right side in FIG. 6.

Between a position in an approximately middle in a length direction of the base portion 2 and the long width-side side portion 7 (the right side in FIG. 6), there is formed a through hole 8. The through hole 8 has a hole inside shape following an outline shape of the base portion 2. A length of the through hole 8 in a direction along the length direction of the base portion 2 is large on one face side 9 (a side where the second finger-hooking face 6 is formed) of the base portion 2, and is small on the other face side 10 of the base portion 2 (see FIG. 5), thereby, a hole inner wall 8a of the through-hole 8 located at the position in the approximately middle in the length direction of the base portion 2 has an inclined face reducing the length of the through hole 8 toward the other face side 10 of the base portion 2. Thereby, in the present embodiment, by passing the string S and the like through such through hole 8, the string S attached to the end cover C through the end cover C and the string S passing through the through hole 8 and the like can be connected.

In the short width-side side portion 7 (the left side in FIG. 6) of the base portion 2, there is formed a thickness-side end face 11 substantially orthogonal to the first finger-hooking face 5 (see FIG. 5). Between the thickness-side end face 11 and the through hole 8, there is formed the projection portion 22 on the other face side 10 of the base portion 2. The projection portion 22 is formed in a mountain shape reducing a thickness in the direction along the length direction of the base portion 2 as coming close to a top portion 22a, and the first finger-hooking face 5 continuing to the thickness-side end face 11, and a face 22b positioned on a side opposite to the first finger-hooking face 5 are both inclined. Namely, the projection portion 22 includes the top portion 22a having a length along a width direction of the base portion 2; the face 22b positioned on the side opposite to the first finger-hooking face 5; and a face 22c (one portion of a side face of the base portion 2 along the length direction of the base portion 2) positioned between both faces 5 and 22b and which becomes the thickness of the projection portion 22 (see FIG. 7).

As shown in FIG. 5, in the base portion 2, a fitting opening 12 for the lock member 3 is formed between the through hole 8 and the top portion 22a of the projection portion 22. Also, on the thickness-side end face 11 of the base portion 2, there is formed a pulling hole 13 for the string S.

As shown in FIG. 1 and FIG. 5, inside the base portion 2, there is formed a fitting space 14 for the lock member 3 surrounded by a portion forming the hole inner wall 8a of the through hole 8 which becomes the inclined face; a portion forming one face side 9 of the base portion 2; a portion forming the first finger-hooking face 5 of the projection portion 22; and a portion forming the face 22c which becomes the thickness of the projection portion 22.

On the other hand, as shown in FIG. 1, the lock member 3 comprises locking portions 16 relative to the ends Sa of the strings S.

In the illustrated example, as shown in FIG. 1, the lock member 3 comprises a substrate portion 17; a clamping plate portion 18 disposed at an interval for housing the ends Sa of the strings S between the clamping plate portion 18 and the substrate portion 17; and a connection portion 19 connecting the substrate portion 17 and the clamping plate portion 18.

The connection portion 19 has a wall shape connecting the substrate portion 17 and the clamping plate portion 18 so as to house the ends Sa of the strings S respectively on both sides thereof, and orthogonal to both inner faces facing each other of the substrate portion 17 and the clamping plate portion 18.

The locking portions 16 have claw shapes projecting from the connection portion 19. The locking portions 16 are formed respectively on both sides of the connection portion 19. The locking portions 16 are formed on a left side in FIG. 12 which becomes a pulling side of the string S to be housed in the lock member 3. On a right side in FIG. 12 which becomes a side opposite to the side where the locking portions 16 are formed, there is formed a rising portion 20 rising from the inner face of the substrate portion 17.

Figure 12:
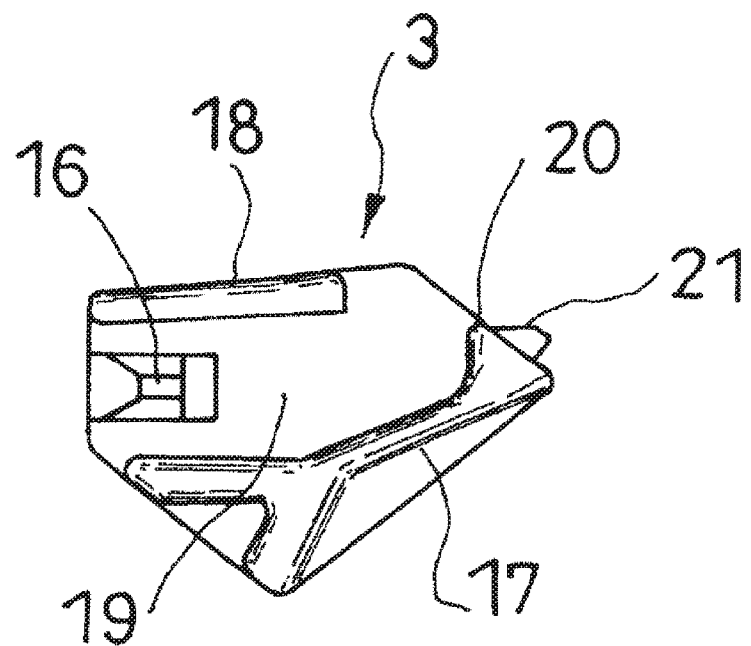
FIG. 12 is a side view on a side of a lock member forming the end cover.
Figure 13:
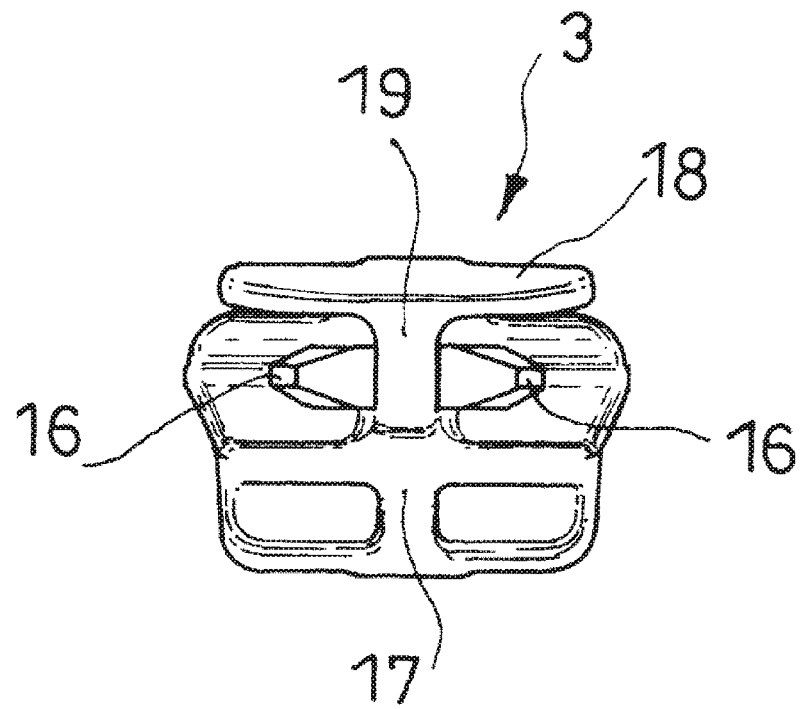
FIG. 13 is a side view of the lock member, and shows the lock member viewed from a left side in FIG. 12.
Figure 14:
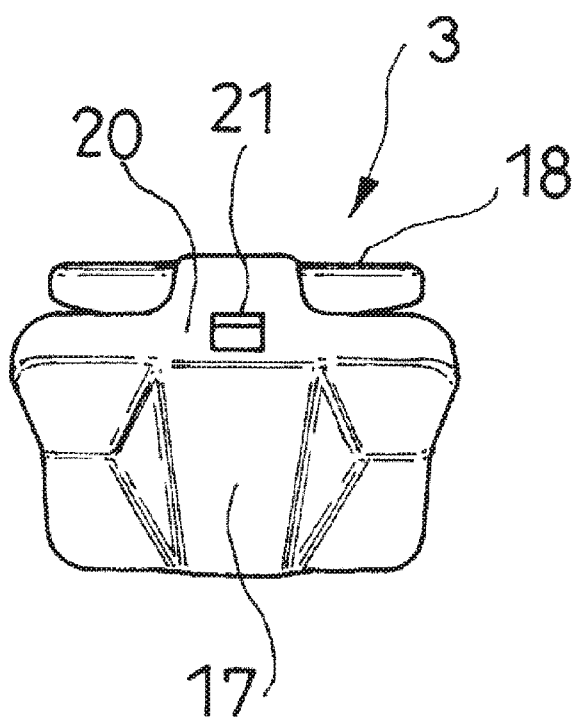
FIG. 14 is a side view of the lock member, and shows the lock member viewed from a right side in FIG. 12.

The lock member 3 can fit into the fitting space 14 through the fitting opening 12 (see FIG. 5) from the left side in FIG. 12 in a direction where an outer face of the clamping plate portion 18 contacts an inner face of the portion forming one face side 9 of the base portion 2. In the fitting state, the fitting opening 12 is closed by the outer face of the substrate portion 17. Also, the aforementioned fitting state is maintained such that at a fitting end position where an engagement projecting portion 21 (shown in FIG. 2) formed on an outer face of the rising portion 20 of the substrate portion 17 fits into an engagement hole 23 (shown in FIG. 2) formed in the portion forming the hole inner wall 8a of the through hole 8 which becomes the inclined face of the base portion 2, the lock member 3 is housed in the case member 4 by an elastic return of both the case member 4 and the lock member 3, or either one of the case member 4 or the lock member 3.

Figure 4:
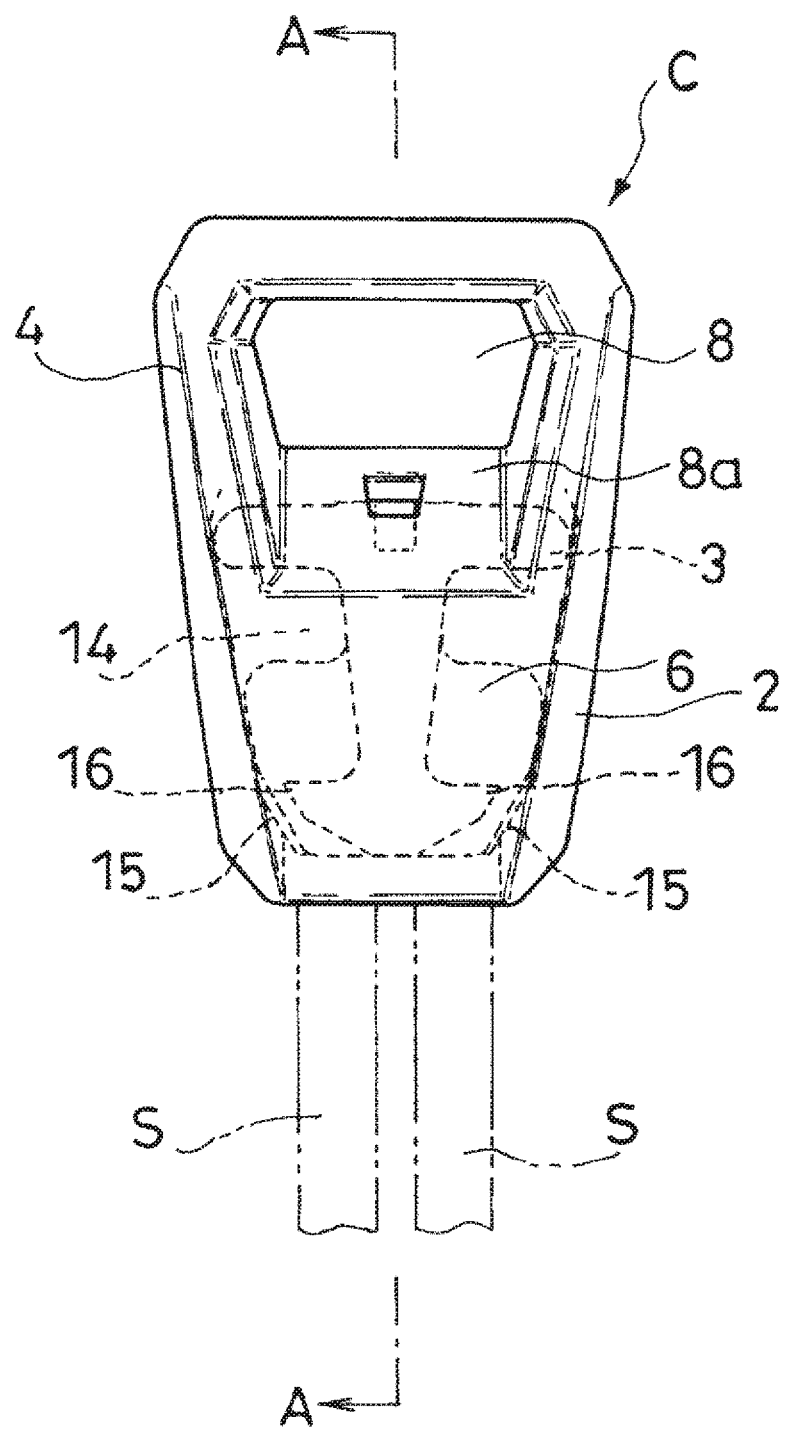
FIG. 4 is a front view showing a use state of the end cover.

In the fitting space 14 as an inside of the case member 4, there are formed locking faces 15 for fixing the end cover C into the end in cooperation with the locking portions 16 (see FIG. 4). In the illustrated example, such locking faces 15 are formed by inner faces of the portion forming the face 22c which becomes the thickness of the projection portion 22.

From a state wherein the ends Sa of the strings S are housed respectively on both sides of the connection portion 19 of the lock member 3, and the strings S to be pulled out of the lock member 3 are pulled out of the pulling hole 13 through the fitting opening 12 of the case member 4 (FIG. 1 to FIG. 3), when the lock member 3 fits into the fitting space 14 in the aforementioned manner, the strings S are tightened between the locking faces 15 and the locking portions 16 so that the locking portions 16 bite into the strings S (FIG. 4). Thereby, the end cover C is fixed into the ends Sa of the strings S.

Both the case member 4 and the lock member 3, or either one of the case member 4 or the lock member 3 are or is a plastic molded article so as to appropriately provide a necessary elastic deformation property to both the case member 4 and the lock member 3, or either one of the case member 4 or the lock member 3.

Incidentally, obviously, the present invention is not limited to the embodiment explained hereinabove, and includes all embodiments which can obtain the object of the present invention.

EXPLANATION OF SYMBOLS

S strings
Sa ends
C an end cover
1 a finger-hooking projecting portion
2 a base portion
5 a first finger-hooking face
6 a second finger-hooking face Incidentally, all contents of the specification, claims, drawings, and abstract of Japanese Patent Application No. 2016-100626 filed on May 19, 2016 are cited in their entireties herein and are incorporated as a disclosure of the specification of the present invention.

What is claimed is:

1. A string end cover adapted to be attached to an end of a string, comprising:
   a base portion including an upper face forming a second finger-hooking face, an end face extending from an end of the upper face, a finger-hooking projecting portion extending from the end face in a direction away from the upper face and having a first finger-hooking face, a fitting space formed between the upper face and the finger-hooking projecting portion, a fitting opening communicating with the fitting space, a through hole adjacent the fitting space, and a pulling hole formed in the end face and communicating with the fitting space for inserting the string therethrough; and
   a lock member inserted into the fitting space through the fitting opening.

2. The string end cover according to claim 1, wherein the lock member includes a locking portion relative to the end of the string, and the base portion further includes, at an inside, a locking face for fixing the lock member in cooperation with the locking portion.

3. The string end cover according to claim 1,
   wherein the second finger-hooking face is provided at a position to suppress a rotation of the end cover at a support point on the first finger-hooking face when a pulling force acts on the string using the first finger-hooking face.

4. The string end cover according to claim 1, wherein the fitting opening is located under the upper face.

5. A string end cover adapted to be attached to an end of a string, comprising:
   a base portion including an upper face forming a second finger-hooking face, an end face extending from an end of the upper face, a finger-hooking projecting portion extending from the end face in a direction away from the upper face and having a first finger-hooking face, a fitting space formed between the upper face and the finger-hooking projecting portion, and a fitting opening communicating with the fitting space; and
   a lock member inserted into the fitting space through the fitting opening,
   wherein the fitting space is surrounded by a portion forming a hole inner wall of a through hole which becomes an inclined face; a portion forming one face side of the base portion; a portion forming the first finger-hooking face; and a portion forming a face which becomes a thickness of the projection portion.

* * * * *